Oct. 16, 1923.
E. DIETZ
1,471,247
SWIVEL FOR TRUCK WHEELS
Filed Jan. 28, 1922
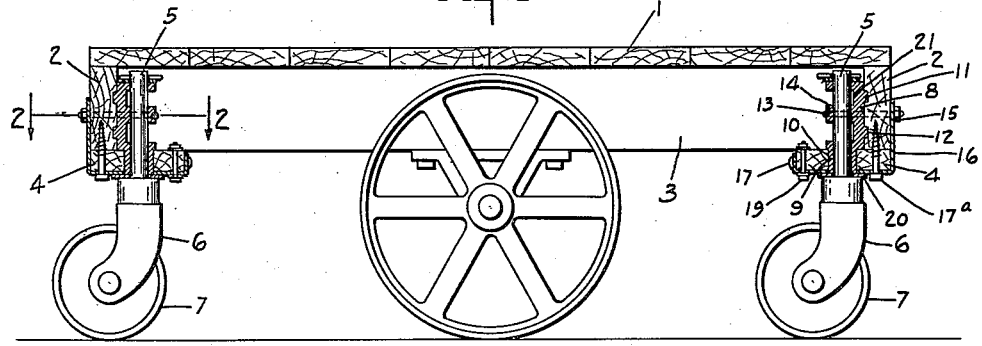
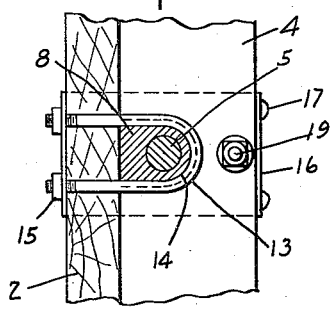
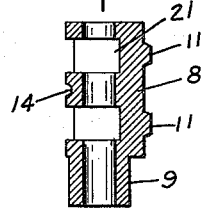
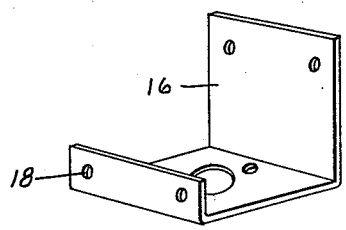
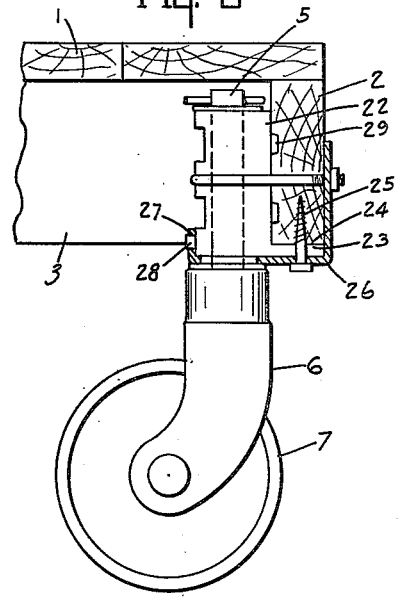
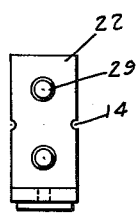
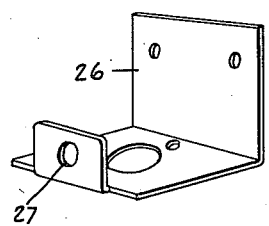
INVENTOR.
EMIL DIETZ.
BY
ATTORNEY.

Patented Oct. 16, 1923.

1,471,247

UNITED STATES PATENT OFFICE.

EMIL DIETZ, OF INDIANAPOLIS, INDIANA.

SWIVEL FOR TRUCK WHEELS.

Application filed January 28, 1922. Serial No. 532,401.

*To all whom it may concern:*

Be it known that I, EMIL DIETZ, a citizen of the United States, residing at Indianapolis, in the county of Marion and State of Indiana, have invented certain new and useful Improvements in a Swivel for Truck Wheels, of which the following is a specification.

This invention relates to a swivel for truck wheels and is designed primarily for use in connection with trucks employed for transporting articles from one point of a building to another, or upon platforms, and the like, and the prime feature of the invention is the provision of a swivel bearing adapted to be connected to the end bar of the frame of the truck and held in fixed relation therewith.

A further feature of the invention is the provision of reinforcing means for bracing the swivel bearing as well as parts of the truck to which it is attached.

A further feature of the invention is the provision of a securing means for the swivel bearing which may be quickly applied for securing the bearing in position and so constructed as to positively bind the swivel bearing against the parts of the truck, and which may be readily adjusted from time to time should the swivel become slightly loosened by usage, the securing means for the swivel also serving to anchor one end of the bracing means.

Other objects and advantages will be hereinafter more fully set forth and pointed out in the accompanying specification.

In the accompanying drawings,

Figure 1 is a longitudinal sectional view through a truck showing the swivel and parts associated therewith connected to the truck, Figure 2 is an enlarged sectional view as seen on line 2—2, Fig. 1, Figure 3 is an enlarged detail sectional view through the swivel bearing, Figure 4 is a perspective view of the brace member removed from the truck.

Figure 5 is a sectional view through a portion of a truck showing a slightly different construction of swivel bearing, Figure 6 is a rear elevation of that form of swivel bearing shown in Figure 5, and Figure 7 is a perspective view of the reinforcing member associated with that form of swivel bearing shown in Figure 5.

Referring to the drawings, 1 indicates a truck which may be of the usual or any preferred construction and having end bars 2 and depending side bars 3, and if desired a brace bar 4 may be attached to the lower edges of the side bars and end bars at each end of the truck, the brace bar 4 extending in a horizontal plane.

In attaching truck wheels to trucks of this nature, owing to the heavy weights transported on the trucks, considerable difficulty is encountered in preventing the strain to which the truck is subjected loosening the swivel parts to which the truck wheels are attached, and to overcome this objectionable feature the shank 5 of the yoke 6, in which is mounted the truck wheel 7, is extended through a swivel bearing 8, one face of the bearing resting against the inner face of the end bar 2, while the lower end of the bearing is formed into a sleeve 9 which passes through an opening 10 in the brace bar 4.

On the rear face of the bearing 8 are studs 11 which enter seats 12 in the face of the brace bar 4, said studs holding the bar 8 against lateral swinging movement. The bearing 8 is secured to the end bar 2 by means of a substantially U-shaped bolt 13, the closed end of the bolt passing around the bearing 8 and entering a channel 14 formed in the face of the bearing, the free ends of the bolt passing through the end bar 2 and having nuts 15 threaded thereon. The free ends of the bolt 13 also pass through one arm of the reinforcing and bracing member 16, which extends over the outer face of the bar 2 beneath the lower face of the brace bar 4, and thence upwardly over the inner edge of the brace bar 4, said reinforcing member being substantially L-shaped. The inner upwardly extending portion of the reinforcing member 16 is connected with the edge of the brace bar 4 by inserting screws, or the like, 17 through openings 18 and into the edges of the brace bar 4, while a bolt 19 is extended upwardly through the horizontal portion of the reinforcing member and through the brace bar 4. In addition to the above means for securing the member 16 to the bars 2 and 4, a lag screw 17[a] may be passed upwardly through the member 16 and through the bar 4 into the lower edge of the bar 2. By attaching the reinforcing member in this manner the swivel bearing 8 will be more thoroughly braced and the bars 2 and 4 will be rendered more rigid.

As considerable wear occurs at the lower end of the swivel bearing 8 an enlarged washer 20 is placed around the shank 5 and rests upon the upper end of the yoke, and owing to the large area of this washer, undue wear is eliminated between these parts and the face of the horizontal portion of the reinforcing member 16.

Parts of the housing 8 are hollowed out to form pockets 21, and if desired lubricant may be introduced into these pockets for properly lubricating the shank 5.

In some instances the brace bar 4 is dispensed with, and in such constructions that form of swivel bearing shown in Figure 5 is used, in which the bearing 22 is extended to the lower edge of the end bar 2, and a tongue 23 extending laterally from the lower portion of the bearing, enters a seat 24 formed in the lower edge of the end bar 2, and a screw 25, or other securing device, may be extended upwardly through the tongue and into the edge of the end bar 2. The reinforcing member 26 employed with this form of bearing is substantially of the same shape as the other form but the upwardly extending inner end of the reinforcing member is extended over the inner face of the bearing 22 and has an opening 27 for engagement with a stud 28 extending outwardly from the bearing. This form of bearing is also provided on its rear face with studs 29 which enter the seats 12 in the end bar 2.

Having thus fully described my said invention, what I claim as new and desire to secure by Letters Patent, is:

1. The combination with a truck frame having an end bar, of a swivel bearing for receiving the shank of a wheel supporting yoke, a substantially L-shaped reinforcing member associated with each bearing and a single bolt memeber for securing both the swivel bearing and one end of the reinforcing member to the end bar, substantially as set forth.

2. The combination with a truck having an end bar, of a swivel bearing, a reinforcing member associated with the swivel bearing, a substantially U-shaped bolt passing around the bearing and through the reinforcing member for securing the swivel bearing and reinforcing member to the end bar, substantially as set forth.

3. The combination with a truck having an end bar, of a swivel bearing, a substantially L-shaped reinforcing member separate from the swivel bearing, and a single means for connecting one end of said reinforcing member and swivel bearing to said end bar.

4. The combination with the end bar and brace bar of a truck, of a swivel bearing having one of its ends extending through the brace bar, a substantially U-shaped bolt construction passing around said bearing for securing the swivel bearing to said bar, means for holding the swivel member against lateral movement on the end bar, and a reinforcing member for said end bar and brace bar, one end of which is held in place by said U-shaped bolts.

5. The combination with a truck frame having an end bar and a brace bar, of a swivel bearing on one side of the end bar for receiving the shank of a wheel supporting yoke, a substantially L-shaped reinforcing member having its vertical portion on the opposite side of said end bar and its horizontal portion passing below the brace bar and engaged with the said shank said L-shaped member having an upturned portion parallel with the said vertical portion for engagement with the inner side of the brace bar, substantially as set forth.

In witness whereof, I have hereunto set my hand and seal at Indianapolis, Indiana, this 24th day of January, A. D. nineteen hundred and twenty-two.

EMIL DIETZ. [L. S.]

Witnesses:
CAREY S. FRYE,
M. L. SHULER.